United States Patent [19]

Pickles

[11] Patent Number: 5,556,165
[45] Date of Patent: Sep. 17, 1996

[54] INFINITELY ADJUSTABLE LINEAR ACTUATOR FOR VEHICLE SEAT

[76] Inventor: Joseph Pickles, 4861 Moonglow Dr., Troy, Mich. 48098

[21] Appl. No.: 262,044

[22] Filed: Jun. 17, 1994

[51] Int. Cl.$^6$ ...................................................... B60N 7/22
[52] U.S. Cl. ...................... 297/362.14; 74/89.15
[58] Field of Search .................. 297/362.11, 362.12, 297/362.14; 74/89.15

[56] References Cited

U.S. PATENT DOCUMENTS

| | | |
|---|---|---|
| 2,018,825 | 10/1935 | Wood . |
| 2,018,828 | 10/1935 | Bell . |
| 2,596,760 | 5/1952 | Bryant . |
| 3,127,788 | 4/1964 | Martens . |
| 3,339,975 | 9/1967 | Posh . |
| 3,350,135 | 10/1967 | Martens . |
| 3,356,411 | 12/1967 | Homier et al. . |
| 3,369,841 | 2/1968 | Heyl, Jr. . |
| 3,383,135 | 5/1968 | Posh . |
| 3,398,986 | 8/1968 | Homier . |
| 3,774,964 | 11/1973 | Turner . |
| 4,223,946 | 9/1980 | Kluting . |
| 4,291,914 | 9/1981 | Mizelle . |
| 4,387,926 | 6/1983 | Van Eerden et al. . |
| 4,408,799 | 10/1983 | Bowman . |
| 4,579,386 | 4/1986 | Rupp et al. . |
| 4,589,301 | 5/1986 | Griner . |
| 4,592,591 | 6/1986 | Wiers . |
| 4,630,866 | 12/1986 | McFarlane . |
| 4,669,781 | 6/1987 | Conroy et al. . |
| 4,685,734 | 8/1987 | Brandoli ............................ 297/362.12 |
| 4,759,587 | 7/1988 | Bucka . |
| 4,770,465 | 9/1988 | Wiers . |
| 4,782,715 | 11/1988 | Chevance . |
| 4,799,734 | 1/1989 | Périou . |
| 4,824,172 | 4/1989 | Rees . |
| 4,881,775 | 11/1989 | Rees . |
| 4,893,704 | 1/1990 | Fry et al. ............................. 74/89.15 X |
| 5,052,752 | 10/1991 | Robinson ............................ 297/362.14 |
| 5,222,710 | 6/1993 | White et al. . |
| 5,280,999 | 1/1994 | Jones et al. ...................... 297/362.14 X |
| 5,299,853 | 4/1994 | Griswold et al. .................. 74/89.15 X |
| 5,320,413 | 6/1994 | Griswold et al. .................. 297/362.12 |

FOREIGN PATENT DOCUMENTS

| | | |
|---|---|---|
| 0493198 | 7/1992 | European Pat. Off. . |
| 2633990 | 1/1990 | France . |
| 2044341 | 10/1980 | United Kingdom . |

Primary Examiner—Peter R. Brown
Attorney, Agent, or Firm—Robert P. Seitter; J. Gordon Lewis

[57] ABSTRACT

A infinitely adjustable linear actuator adjusts the position of two relatively movable components of a vehicle seat. The linear actuator includes a rotatable element threadingly engaged about a threaded shaft. First and second moving members are mounted within a housing surrounding the rotatable element and are disposed on opposite sides of an annular collar formed on the rotatable element. The moving members are movable between a first position in which the moving members disengage the rotatable element from bearing surfaces at opposite ends of the housing to form a high rotational resistance which prevents rotation of the rotatable element and movement of the interconnected threaded shaft, and a second position in which the moving members are spaced from the rotatable element to enable the rotatable element to move axially into low resistance engagement with one of the bearing surface which enables rotation of the rotatable element and movement of the threaded shaft. Pairs of angularly extending tabs formed on each moving member slide within angled slots formed in the housing to guide the moving members between the first and second positions.

38 Claims, 6 Drawing Sheets

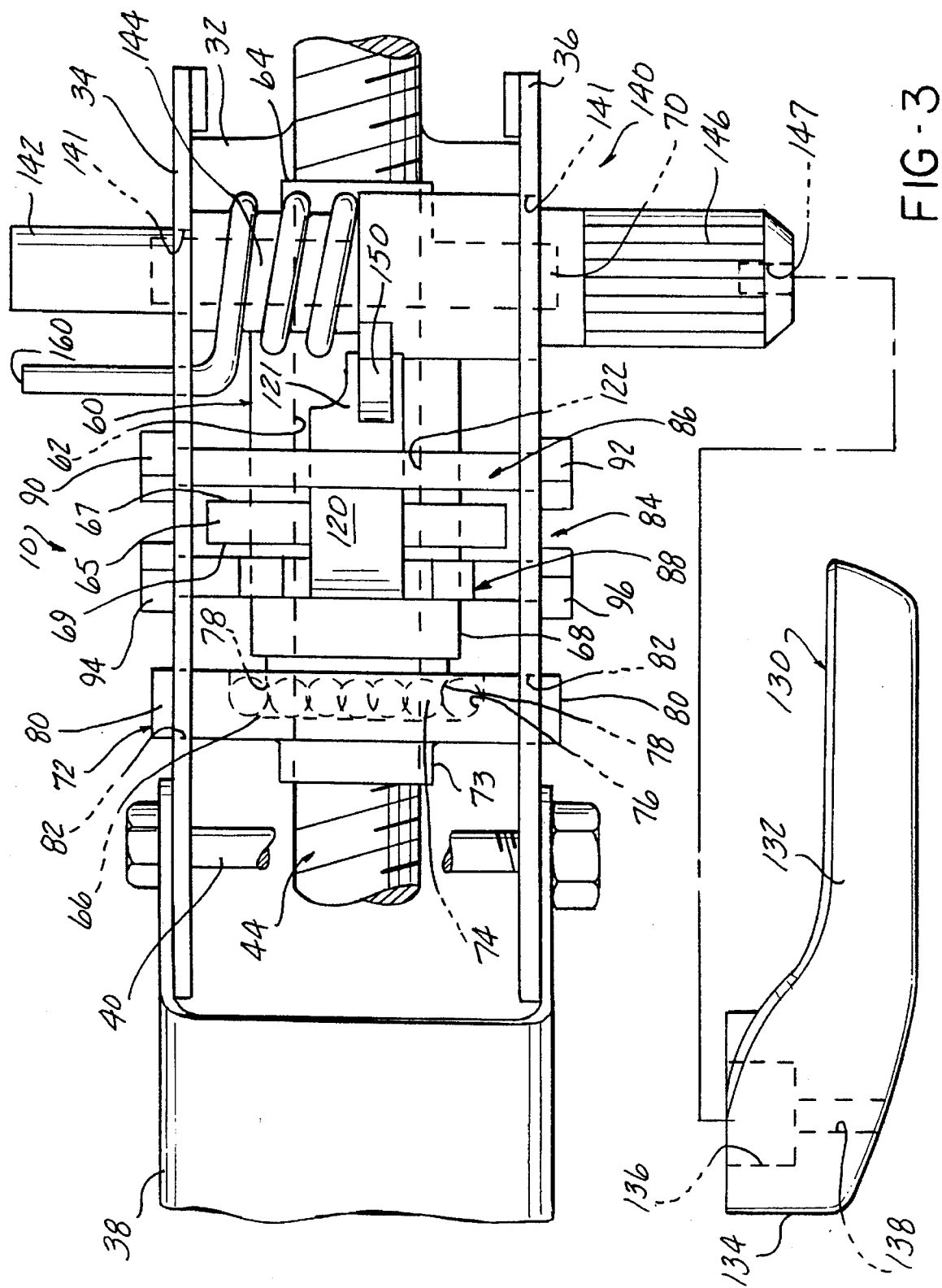

INFINITELY ADJUSTABLE LINEAR ACTUATOR FOR VEHICLE SEAT

BACKGROUND OF THE INVENTION

1. Field of the Invention

The present invention relates, in general, to linear actuators and, more specifically, for linear actuators for positioning vehicle seat components.

2. Description of the Art

Vehicle seat assemblies are usually provided with a seat adjuster for adjusting the horizontal fore and aft position of an upper track movably mounted in a lower track fixed to the vehicle and, in some cases, with a seat recliner for adjusting the angular position of a pivotal seat back with respect to a seat track assembly mounted on the vehicle floor. One type of seat adjuster includes a plurality of discrete, spaced positions or detents for releasibly locking the upper track to the lower track.

Another type of seat adjuster which is also usable as a seat recliner utilizes a linear actuator formed of a threadingly engaged lead screw and nut to provide an infinite number of user selectible seat adjustment positions. Various means are utilized to releasibly lock the nut in a fixed position to prevent rotation of the nut and the lead screw so as to fix one of the movable components of the seat in a user selected, adjusted position with respect to other components of the vehicle seat. While the latter described type of linear actuator is capable of providing infinite seat adjustment positions, such a linear actuator still lacks a reliable, smooth release operation, particularly when seat adjustment is made under load, i.e. the user's weight on the seat.

Thus, it would be desirable to provide a linear actuator for a vehicle seat which provides a smooth, reliable lock and lock release. It would also be desirable to provide such a linear actuator for a vehicle seat which provides an infinite number of seat adjustment positions. Finally, it would be desirable to provide a linear actuator for a vehicle seat which has a simplified construction, reliable operation, a small overall size and minimal weight.

SUMMARY OF THE INVENTION

The present invention is a linear actuator which is ideally suited for controlling the position of two relatively movable components of a vehicle seat.

The linear actuator includes a threaded shaft which threadingly engages a rotatable element having an internal threaded bore. The rotatable element is disposed within a housing which is mounted to one component of a vehicle seat. Bearing means are mounted in opposite ends of the housing for providing a low resistance rotational surface for opposite ends of the rotatable element. The bearing means and the rotatable element are disposed in a predetermined dimensional relationship which enables the rotatable element, when the linear actuator is in the unlocked position, to move axially a short distance with the shaft under axial loads imposed in one direction on the shaft to bring the rotatable element into low resistance rotational engagement with one of the bearing means to enable rotation of the rotatable element under such axial loads on the shaft. A rotatable element displacing means is mounted on the housing for displacing the rotatable element from a low rotational resistance engagement with one of the bearing means to a position in which the rotatable element is disengaged from both of the bearing means. When the displacing means is in the rotatable element disengaging position, the displacing means, the rotatable element and the threaded shaft form a high rotational resistance connection which prevents rotation of the rotatable element and thereby prevents movement of the shaft threadingly engaged with the rotatable element.

In a preferred embodiment, an enlarged annular collar is formed on the rotatable element. The lock means or members are disposed adjacent to and engage the collar to displace the rotatable element to the non-rotatable position.

Preferably, the displacing means includes first and second moving members and moving means, mounted in the housing, for moving the first and second moving members into and out of engagement with the rotatable element.

The moving means preferably comprises drive means including a drive pin rotatably mounted in the housing. A release lever is attached to the drive pin and bidirectionally rotates the drive pin upon bidirectional pivotal movement of the release lever. A pair of drive fingers are mounted on the drive pin and alternately engage the first and second moving members upon bidirectional rotation of the drive pin to move the first and second moving members into and out of engagement with the rotatable element depending upon the direction of pivotal movement of the release lever.

The linear actuator also includes guide means formed on the moving members and the housing for guiding the movement of the moving members between first and second positions in and out of engagement with the rotatable element. Preferably, the guide means comprises at least one pair of tabs mounted on and extending outward from each of the moving members, with the tabs slidingly extending through guide slots formed in a side wall portion of the housing. Both the tabs and the guide slots are angularly disposed with respect to the plane of the annular collar on the rotatable element to move the moving members toward and away from the rotatable element.

In a preferred embodiment, each moving member includes two pairs of tabs which extend through spaced guide slots in the housing. The pairs of tabs on the first moving member and the corresponding guide slots in the housing are angularly disposed at identical angles with respect to the plane of the moving member. However, the tabs on the first moving member extend at oppositely directed angles from the pairs of tabs on the second moving member.

Further, the first and second moving members are interconnected for simultaneous movement by the moving means into and out of engagement with the rotatable element.

The infinitely adjustable linear actuator of the present invention may be employed in a horizontal position on a vehicle seat assembly, with the housing attached to one track of a vehicle track assembly and one end of the threaded shaft attached to a pivotal seat back pivot link to act as a seat back recliner.

Alternately, the linear actuator may be mounted in a substantially vertical position on a vehicle seat assembly with one end of the threaded shaft pivotally connected to the seat track assembly and the housing of the linear actuator mounted on the seat back frame to again enable the linear actuator to serve as a seat back recliner.

Further, the linear actuator may be mounted to a vehicle seat assembly with the threaded shaft fixedly mounted to the lower seat track. The housing surrounding the rotatable element is attached to the movable upper track such that when the moving members are in the disengaged position, axial forces imposed on the upper track cause rotation of the rotatable element to enable horizontal fore and aft translation of the upper track with respect to the fixed lower track.

The infinitely adjustable linear actuator of the present invention, besides providing an infinite number of user selectible positions between two relatively movable components of a vehicle seat, also provides the infinitely adjustable positions with a simple, lightweight small package size. Further, the linear actuator of the present invention provides a smooth, low force release from the locked position and also prevents chucking or undesirable movement of the seat back with respect to the seat bottom when the linear actuator is in the fully engaged or locked position. Finally, the linear actuator is constructed to provide a high resistive force to rotation of the rotatable element, which resistive force proportionally increases with increased force applied to the threaded shaft.

BRIEF DESCRIPTION OF THE DRAWING

The various features, advantages and other uses of the present invention will become more apparent by referring to the following detailed description and drawing in which:

FIG. 3 is a partially exploded, bottom elevational view of the linear actuator shown in FIG. 2;

DESCRIPTION OF THE PREFERRED EMBODIMENTS

Figure 1:
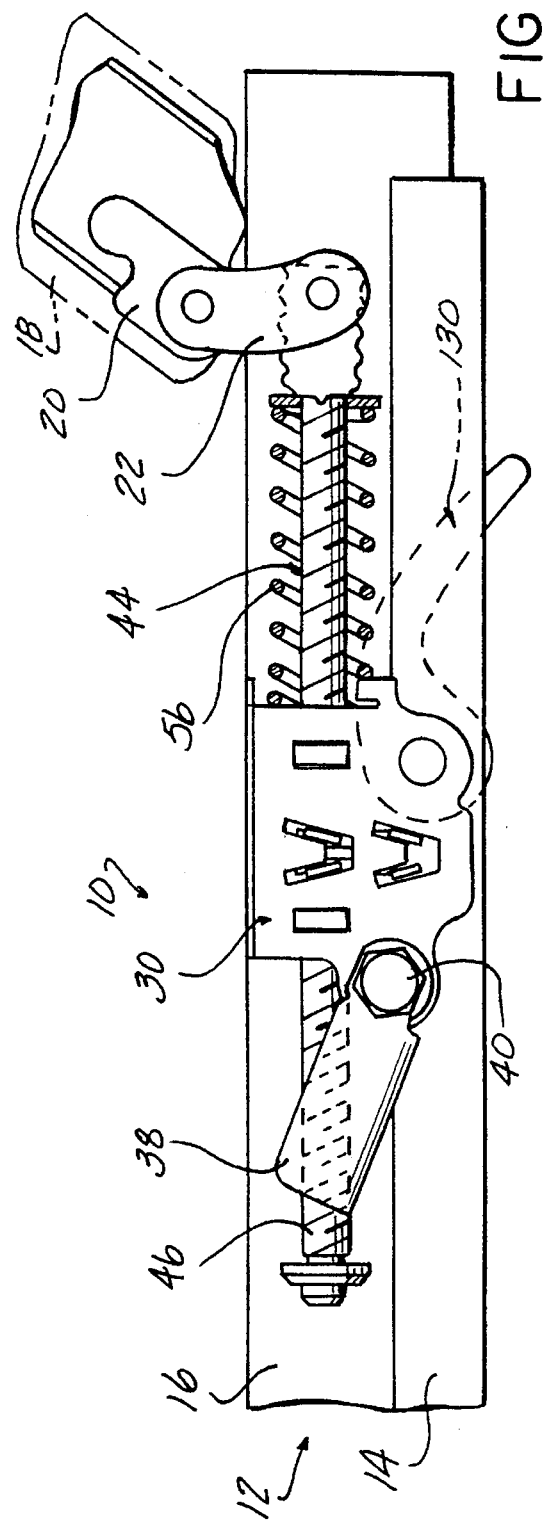
FIG. 1 is a side elevational view of one embodiment of a linear actuator constructed in accordance with the teachings of the present invention mounted for use as a seat recliner.

Referring now to the drawing, and to FIGS. 1–7 in particular, there is depicted one embodiment of an infinitely adjustable linear actuator 10 constructed in accordance of the teachings of the present invention and employed as a vehicle seat recliner actuator.

As is conventional, a vehicle seat includes opposed track assemblies 12, only one of which is shown in FIG. 1. Each track assembly 12 includes a lower track or rail 14 which is fixedly mounted to a vehicle floor. An upper track 16 is slidably mounted within the lower track 14 and is horizontally movable fore and aft with respect to the lower track 14.

A seat back 18 is pivotally mounted to the seat track assembly 12 by means of a pivotal connection between a seat back frame 20 and a seat back pivot link 22. The seat back pivot link 22 is connected at one end to the seat back frame 20 and at another end to a movable element of the linear actuator 10. Actuation of the linear actuator 10 results in pivotal movement of the seat back 18 with respect to the seat track assembly 12, as described in greater detail hereafter.

It will be understood that in certain seat applications, two linear actuators may be employed, with each linear actuator mounted on one of the two seat track assemblies. In such an application, the two linear actuators may be interconnected for simultaneous movement or may be completely independent of each other.

Figure 2:
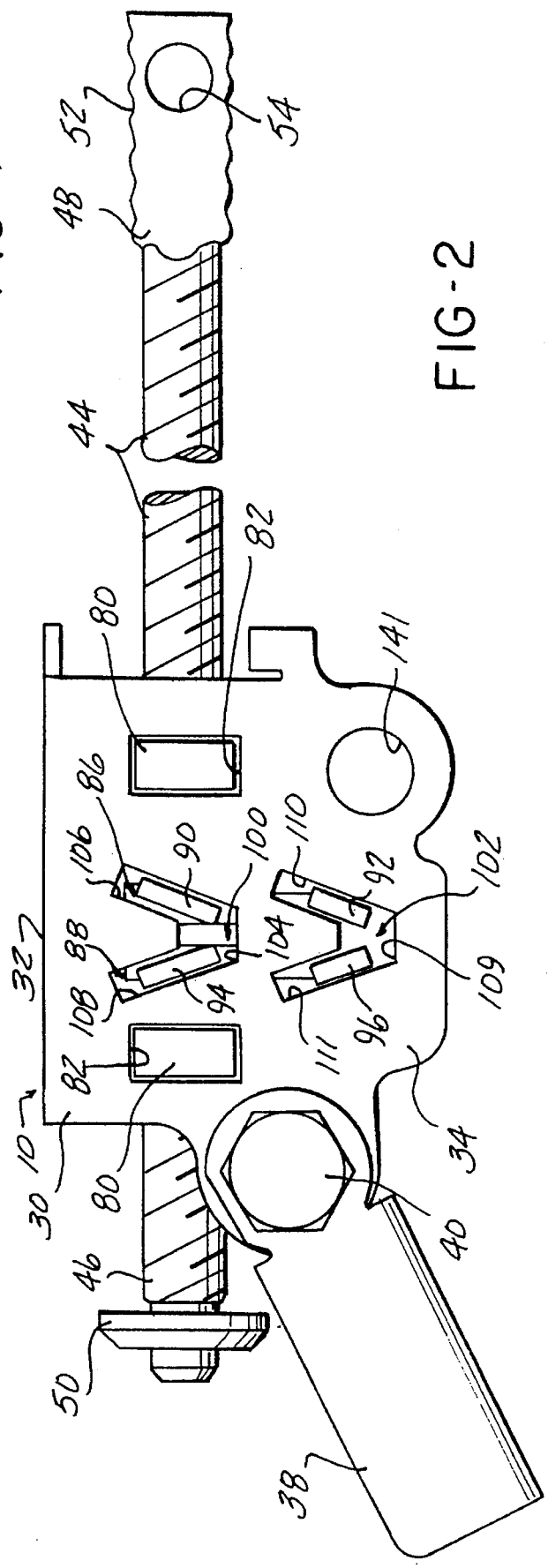
FIG. 2 is an enlarged, side elevational view of the linear actuator shown in FIG. 1.
Figure 4:
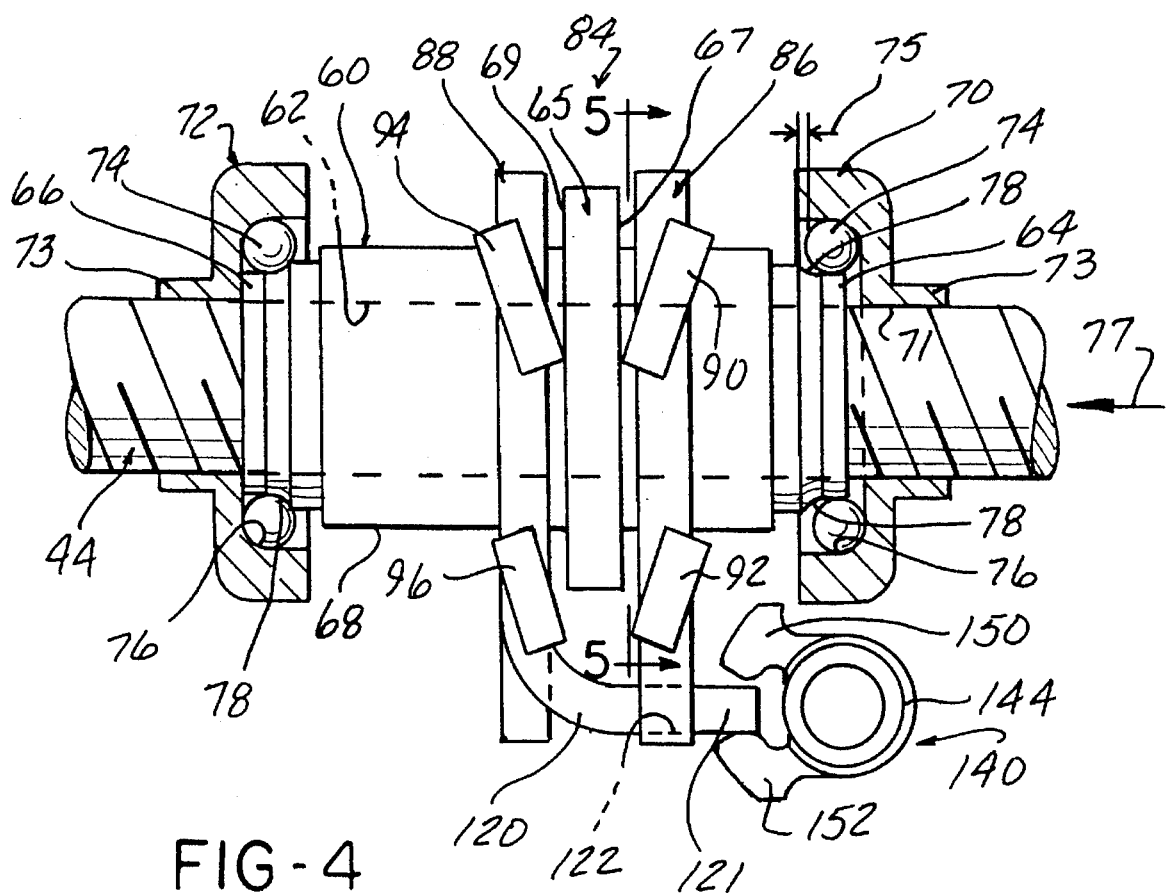
FIG. 4 is a side elevational view of the linear actuator shown in an unlocked position with a portion of the housing removed.

A more detailed view of the linear actuator 10 is shown in FIGS. 2, 3 and 4. The linear actuator 10 includes a housing 30 which may take any suitable form. Preferably, the housing 30 is formed of a single formed member, but may optionally be formed of two or more interconnected or joined members. By example only, the housing 30 has a generally U-shape including a top wall 32 and opposed side walls 34 and 36 which extend from the top wall 32. The top wall 32 and the spaced side walls 34 and 36 define an interior chamber in which certain operative elements of the linear actuator 10 are mounted. The housing 30 may be formed of any suitable material, such as a metal or a high strength plastic.

The housing 30 is adapted to be pivotally mounted to the seat track assembly 12 by means of a bracket 38 which is fixedly joined to the upper track 16 by suitable means and which is pivotally connected by a pivot pin 40 to the housing 30. The bracket 38 securely attaches the housing 30 of the linear actuator 10 to the seat track assembly 12, but enables pivotal movement of the housing 30 about the pivot pin 40.

A shaft 44, such as a threaded lead screw, translatingly extends through the housing 30. The shaft 44 has opposed first and second ends 46 and 48. A stop 50 in the form of a washer is mounted on the first end 46 of the shaft 44. The opposite second end 48 of the shaft 44 is formed in a flat end having threads 52 formed on opposed exterior sides thereof. An aperture 54 is formed in the flat, second end 48 of the shaft 44 and receives a fastener for pivotally attaching the second end 48 of the shaft 44 to the seat back pivot link 22, as shown in FIG. 1.

A biasing means, such as a coil spring 56, is disposed about the shaft 44, adjacent the second end 48 thereof. The spring 56 is seated between the flat end 48 of the shaft 44 and one end of the housing 30, as shown in FIG. 1. When the linear actuator 10 is in the disengaged position permitting movement of the seat back 18, the spring 56 provides a normal biasing force between the housing 30 and the second end 48 of the shaft 44 to normally bias the seat back 18 to a generally upright position as shown in FIG. 1.

As shown in FIGS. 3 and 4, a rotatable element 60 is mounted within the housing 30. The rotatable element 60 is preferably in the form of a nut having an internally threaded through bore 62 which extends between opposed first and second ends 64 and 66. The rotatable element or nut 60 also has a solid exterior side wall or surface 68. An engagement member is formed on the rotatable element 60. Preferably, the engagement member is an enlarged diameter annular collar 65 formed on the rotatable element 60 intermediate the first and second ends 64 and 66. The collar 65 has opposed side surfaces 67 and 69 extending radially outward from the side wall 68 of the rotatable element 60.

As shown in FIG. 4, the rotatable element 60 is seated between two bearing means 70 and 72 which are mounted in opposite ends of the housing 30. As shown in FIGS. 2 and 3, each bearing means 70 and 72 is fixedly mounted between the side walls 34 and 36 of the housing 30 by means of tabs 80 which extend outwardly from opposite sides of each bearing means 70 and 72 and which are snugly mounted in apertures 82 in each side wall 34 and 36 of the housing 30.

When the bearing means 70 and 72 are formed of a metallic material, such as steel, bearings 74, generally in the form of a plurality of ball bearings mounted in a bearing race, are mounted in an interior recess 76 in each bearing means 70 and 72 and engage a recessed annular seat 78 formed on each of the first and second ends 64 and 66 of the rotatable element 60.

A through bore 71 extends through each bearing means 70 and 72. In addition, an annular sleeve 73 is formed on the exterior surface of each bearing means 70 and 72 and includes a through bore alignable with the bore 71. The rotatable shaft 44 extends through the bore 71 in the bearing means 70 and 72 as well as through the sleeve 73 thereon.

The bearing means 70 and 72 provide a low resistance or friction surface for rotation of the rotatable element 60 as described hereafter. It will be understood that when the bearing means 70 and 72 are formed of a suitable plastic, the bearings 74 may be eliminated, since the bearing means or members 70 and 72 themselves provide the low resistance surface for the first and second ends 64 and 66 of the rotatable element 60.

According to a preferred embodiment of the present invention, the bearing means 70 and 72, or at least the interior recess or bearing seat surfaces 76 thereof, are disposed in a predetermined dimensional relationship with the seats 78 on the rotatable element 60. This dimensional relationship enables a small amount of axial movement of the rotatable element 60, i.e. approximately 0.020 inches by example only, between the bearing means 70 and 72 when the linear actuator 10 is disengaged from the rotatable element and axial forces are applied to the shaft 44.

The linear actuator 10 also includes rotatable element displacing means 84. The displacing means 84 preferably includes first and second spaced, moving members, 86 and 88, each in the form of a planar plate by way of example only. The moving members 86 and 88 are mounted within the housing 30 and are movable between first and second positions, as described hereafter. As shown in FIGS. 2 and 4, the linear actuator 10 also includes guide means for guiding the movement of the first and second moving members 86 and 88 between the first and second positions. The guide means preferably comprises at least one and preferably a plurality of angularly disposed tabs which are formed on each of the moving members 86 and 88. In a preferred embodiment, the first moving member 86 includes a first pair of angularly disposed tabs 90 and a second spaced pair of tabs 92. The pairs of tabs 90 and 92 are mounted on or integrally formed with the planar moving member 86 and are oriented at a predetermined, identical angle with respect to the plane formed by the first moving member 86, as shown in FIG. 4.

The second moving member 88 includes a first pair of tabs 94 and a second pair of tabs 96 spaced from the first pair of tabs 94. The tabs 94 and 96 are also integrally formed on or otherwise mounted on the planar second moving member 88 and are oriented at a predetermined, identical angle from the plane of the second moving member 88.

The first and second moving members 86 and 88 are mounted within the housing 30 on opposite sides of the enlarged annular collar 65 on the rotatable element 60. In this arrangement, the pairs of tabs 90 and 92 on the first moving member 86 are disposed at an acute angle with respect to the plane of the first side surface 67 on the annular collar 65. The pairs of tabs 94 and 96 of the second moving member 88 are also disposed at the same acute angle, but extend in an opposite direction from the second side surface 69 of the annular collar 65 than the tabs 90 and 92, as shown in detail in FIGS. 4 and 6.

As shown in FIG. 2, the guide means also includes suitably formed guide slots, such as the spaced guide slots 100 and 102 which are arranged in aligned pairs on each of the side walls 34 and 36 of the housing 30. The guide slots 100 and 102 are identically formed and are co-linearly aligned on each side wall 34 and 36. The guide slot 100 has a generally V-shape with a base portion 104 and two outward angularly extending side slots 106 and 108. The side slots 106 and 108 slidably receive the first pair of tabs 90 and 94, respectively, on the moving members 86 and 88. The guide slot 102 also has a V-shape with a base portion 109 and side slots 110 and 111 which slidably receive the second pair of tabs 92 and 96, respectively, on the first and second moving members 86 and 88.

Figure 6:
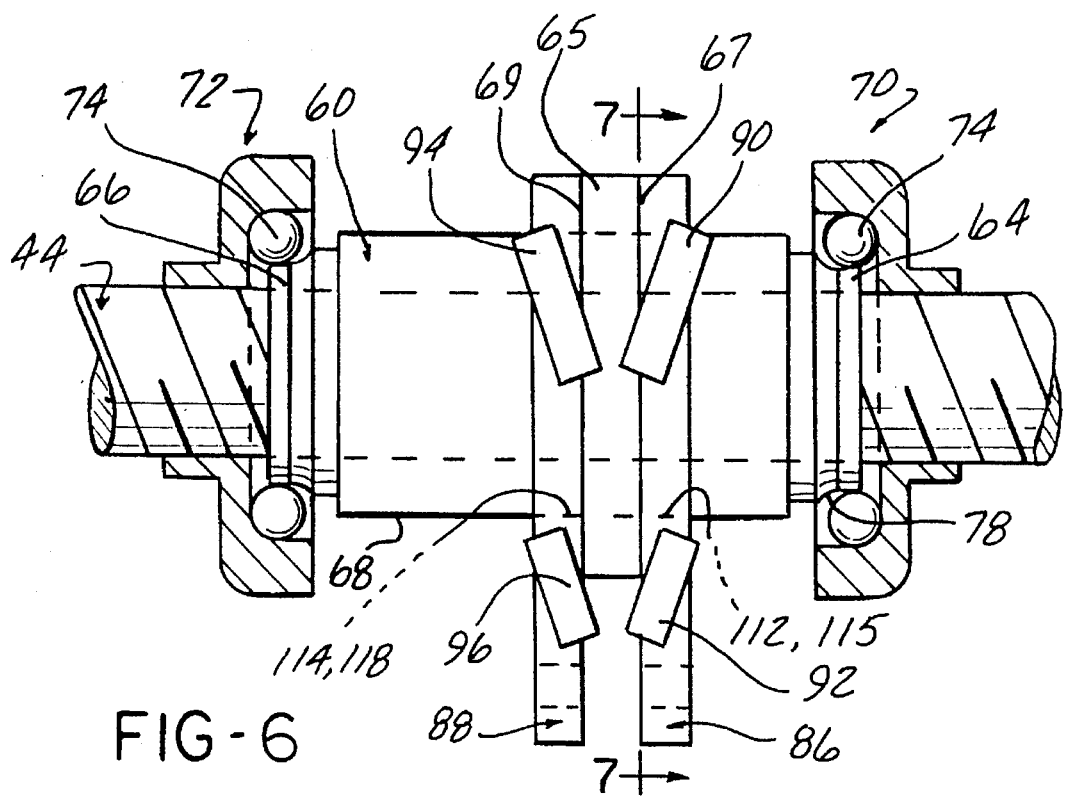
FIG. 6 is a partial, side elevational view, similar to FIG. 4, but showing the linear actuator in a locked position.
Figure 5:
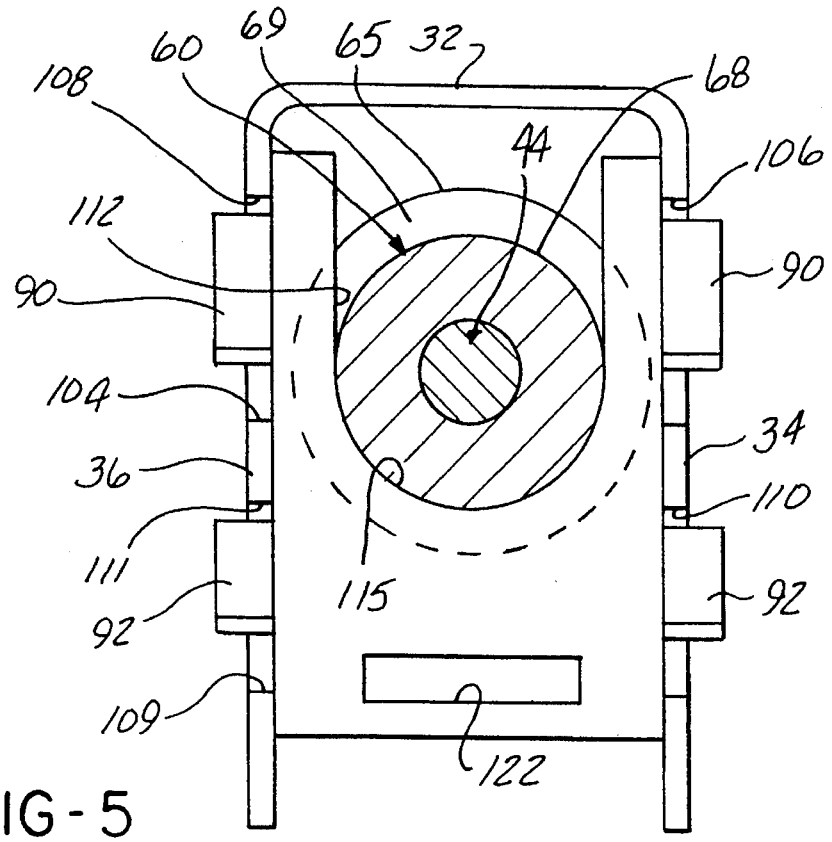
FIG. 5 is a cross sectional view generally taken along line 5—5 in FIG. 4.

An aperture is formed in each of the moving members 86 and 88 for passage of the rotatable element 60 through the moving members 86 and 88. Specifically, an aperture 112 is formed in the first moving member 86 and an aperture 114 is formed in the second moving member 88, as shown in FIGS. 5 and 6. Although the apertures 112 and 114 may have any suitable shape, in a preferred embodiment, the apertures 112 and 114 have a generally U-shape formed by a peripheral edge 115 in the first moving member 86 surrounding the aperture 112 and a peripheral edge 118 surrounding the aperture 114 in the second moving member 88.

Figure 7:
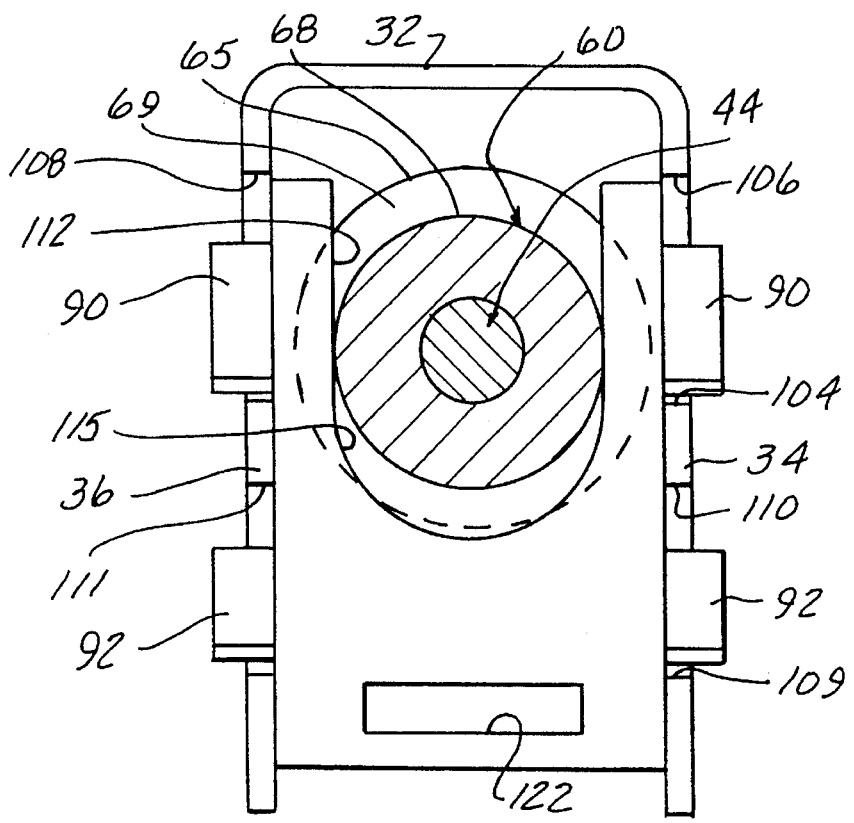
FIG. 7 is a cross sectional view generally taken along line 7—7 in FIG. 6.

The displacing means also includes means for moving the movable members 86 and 88 between a rotatable element disengaged position shown in FIGS. 4 and 5 in which the rotatable element 60 is freely rotatable about the shaft 44 upon axial loading forces imposed on the shaft 44, and an engaged position shown in FIGS. 6 and 7 in which the rotatable element 60 is locked against rotation and thereby prevents corresponding translation or movement of the shaft 44 despite any axial loading forces imposed on the shaft 44.

In order that the first and second moving members 86 and 88 are moved simultaneously between a first engaged position and a second disengaged position, the first and second moving members 86 and 88 are interconnected by means of a leg 120 which is integrally formed on and extends generally perpendicularly from one end of the second moving member 88. The leg 120 has an outer end 121 which is slidably received in and extends through a mating aperture 122 formed in the first moving member 86, as shown in FIGS. 3 and 4.

As shown in FIG. 3, the moving means also includes a release lever 130 having a generally arcuate shaped lever portion 132 and an annular connector end 134. An internal splined bore 136 extends inward through the connector end 134. A smaller fastener receiving bore 138 extends from the bore 136 to the exterior surface of the connector end 134.

A release lever shaft or drive pin 140 is rotatably mounted in apertures the side walls 34 and 36 of the housing 30. The release lever shaft 140 includes a first small diameter end portion 142 which extends through aperture 141 in the side wall 34 of the housing 30. The end portion 142 integrally extends from an enlarged intermediate portion 144. A spline shaft 146 extends from the enlarged portion 144 of the release lever shaft 140 and is disposed exteriorly of the side wall 36 of the housing 30. The splines on the spline shaft 144 mate with the internal splines 136 in the release lever 130 such that pivotal movement of the release lever 130 is transmitted to rotation of the release lever shaft 140.

A fastener, not shown, extends through the bore 138 in the release lever 130 into a bore 147 in the end of the release lever shaft 140 to attach the release lever 130 to the shaft 140.

As shown in FIGS. 3 and 4, a pair of arcuately spaced drive fingers 150 and 152 are integrally formed on the enlarged portion 144 of the release lever shaft 140. The inner ends of the drive fingers 150 and 152 are spaced apart and are disposed on opposite sides of the end 121 of the perpendicular leg 120 extending from the second moving member 88. In this manner, rotation of the release lever 130 between a first position corresponding to a rotatable element engaged position of the linear actuator 10 to a second position corresponding to a rotatable element, disengaged position of the linear actuator 10 results in rotation of the release lever shaft 140 to alternately bring the drive finger 152 or the drive finger 150 into contact with the leg 120 of the plate 88. Depending upon the direction of rotation of the release lever 130 between the first and second positions, engagement of the respective drive fingers 150 and 152 with the leg 120 will cause the interconnected first and second moving members 86 and 88 to move from the unlocked position shown in FIGS. 4 and 5 to the locked position shown in FIGS. 6 and 7.

A biasing spring, such as a coil spring 160, is connected at one end to the side wall 34 of the housing 30 and at another end to the release lever 130 for normally biasing the release lever shaft 140 and the release lever to the first position corresponding to a locked position of the linear actuator 10.

In operation, the linear actuator 10 of the present invention will normally assume a rotatable element engaged position as shown in FIGS. 1, 6 and 7 due to the biasing spring 160 which normally biases the release lever 130 to the first position. In this position, the pairs of tabs 90, 92, 94 and 96 on the first and second moving members 86 and 88 are disposed at the lower ends of the side slots 106, 108, 110 and 111 in each side wall 34 and 36 of the housing 30. Further, the moving members 86 and 88 are in engagement with the side surfaces 67 and 69 of the annular collar 65 on the rotatable element 60. This engagement between the first and second moving members 86 and 88 and the annular collar 65 on the rotatable element 60 disengages the rotatable element 60 from both bearing means 70 and 72. This disengagement coupled with the frictional forces between the threads of the rotatable element 60 and the shaft 44 and the frictional forces between the moving members 86 and 88 and the collar 65 on the rotatable element 60 create a high resistance to rotation of the rotatable element 60. Since the rotatable element 60 is thus locked against rotation, movement of the shaft 44 and pivotal movement of the seat back 18 with respect to the seat track assembly 12 is also prevented. In addition, the secure locking of the rotatable element 60 and the shaft 44 minimizes any chucking or movement of the seat back 18 due to vehicle vibration.

When it is desired to adjust the angular position of the seat back 18 with respect to the seat track assembly 12, the release lever 130 is pivoted to the second unlocked position. This pivotal movement of the release lever 130 causes rotation of the release lever shaft 140 and brings the drive finger 152 into engagement with the end 121 of the leg 120 of the second moving member 88 and causes movement of the second moving member 88 and the interconnected first moving member 86 from the engaged position shown in FIGS. 6 and 7 to disengaged position shown in FIGS. 4 and 5. During this sliding movement of the moving members 86 and 88, the tabs 90, 92, 94 and 96 on the first and second moving members 86 and 88 slide away from the bottom portions 104 and 109 of the guide slots 100 and 102 and along the side slots 106, 108, 110 and 111 to axially displace the moving members 86 and 88 away from engagement with the annular collar 65, as shown in FIG. 4. With the moving members 86 and 88 disengaged from the rotatable element 60, the rotatable element 60 is free to move axially a slight distance as shown by reference number 75 in FIG. 4 into engagement with one of the bearing means 70 or 72 depending on the direction of axially loading on the shaft 44. For example, if an axial load is imposed on the shaft 44 in the direction of arrow 77 in FIG. 4, such as by a pivoting force applied to the seat back 18, the shaft 44 and the rotatable element 60 will move axially to the left to bring the bearing seat 78 on the second end 66 of the rotatable element 60 into engagement with the bearing means 72. This engagement provides a low rotation resistance which enables the rotatable element 60 to freely rotate under the axial loading forces applied to the rotatable shaft 44. As a result, since the rotatable element 60 is free to rotate, such axial loading forces result in translation of the shaft 44 which enables pivotal movement of the pivot link 22 and thereby pivotal movement of the seat back frame 20 and seat back 18. When the seat back 18 is in the desired angular position with respect to the seat track assembly 12, the release lever 130 is released which, through the biasing spring 160, causes the release lever shaft 140 to rotate in an opposite direction thereby bringing the drive finger 150 into engagement with the end 121 of the leg 122 of the moving member 88 and causes a resulting sliding movement of the interconnected moving members 86 and 88 back to the engaged position shown in FIGS. 6 and 7.

When an axial load is applied to the shaft 44 in a direction opposite to arrow 77, the shaft 44 and the rotatable element 60 will axially move a small distance 75 to the right as viewed in FIG. 4 to bring the bearing seat 78 on the first end 64 of the rotatable element 60 into engagement with the bearing means 70 to again allow rotation of the rotatable element 60.

It will be further understood that when the linear actuator 10 is in the locked position shown in FIGS. 6 and 7, any axial loading forces imposed upon the seat back 18 which are transmitted through the seat back frame 20 and the pivot link 22 to the shaft 44 are grounded through the threaded connection between the shaft 44 and the nut 60 and, also, from the nut 60 through the moving means 86 and 88 and the outwardly extending tabs 90, 92, 94 and 96 to the housing 30 which is securely mounted on the seat track assembly 12.

Figure 8:
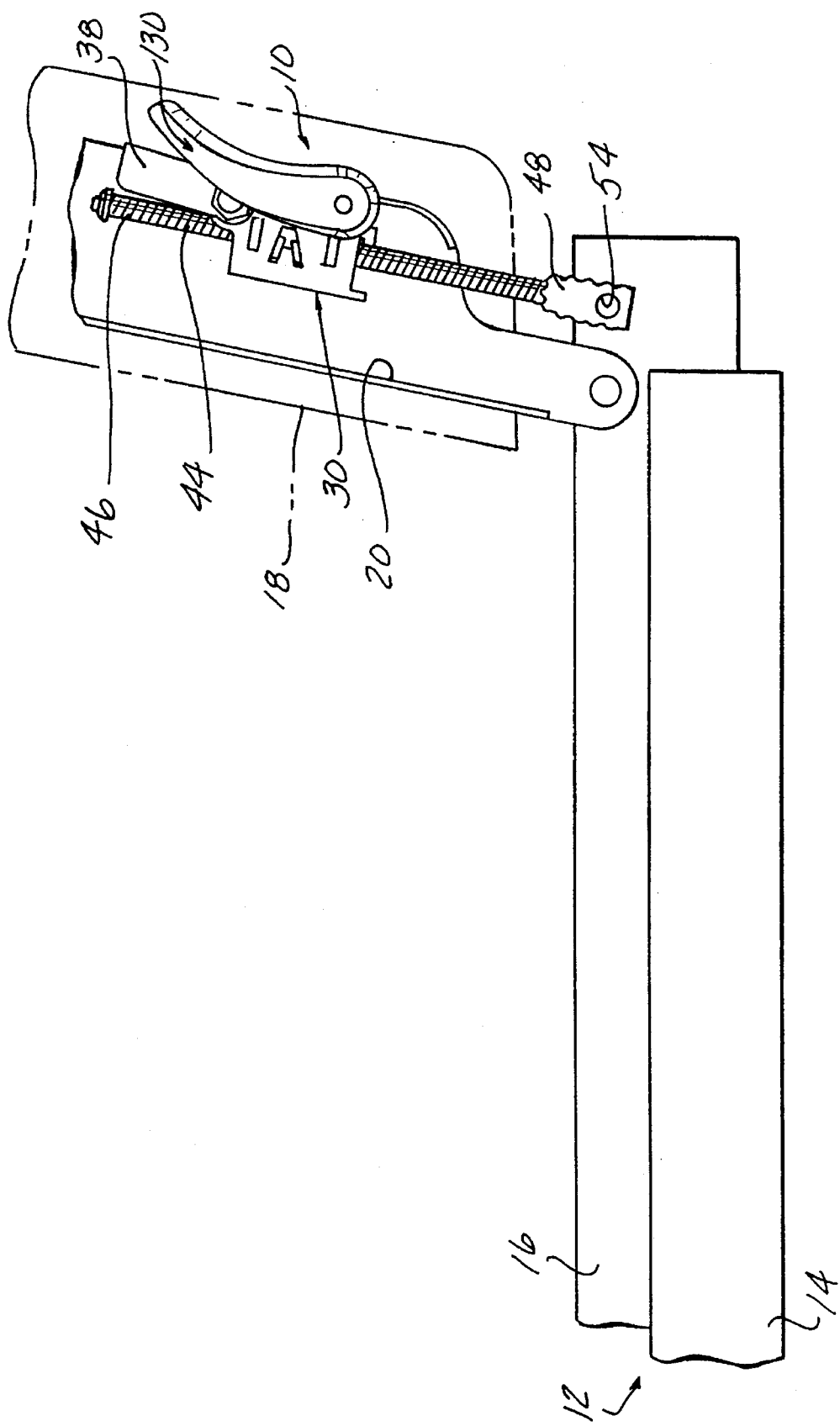
FIG. 8 is a side elevational view of the linear actuator of the present invention mounted for use as a vertical seat recliner.

The linear actuator 10 of the present invention may also be employed as a vertical seat recliner as shown in FIG. 8. In this embodiment, the linear actuator 10 is disposed within the seat back frame 20 and pivotally connected thereto by means of the bracket 38. Further, the second end 48 of the shaft 44 is pivotally connected to one end of the upper track or rail 16 by means of a suitable fastener extending through the aperture 54 in the second end 48 of the shaft 44.

The operation of the linear actuator 10 in the vertical seat recliner embodiment shown in FIG. 8 is substantially identical to that described above and shown in FIGS. 1–7 in that when the moving members 86 and 88 of the linear actuator 10 are engaged with the rotatable element 60, the rotatable element 60 is prevented from rotation which thereby prevents any pivotal movement of the shaft 44 about the pivot pin extending through the aperture 54 in the second end of the shaft 44. However, when the release lever 30 is pivoted to the unlocked position, as described above, the rotatable element is free to rotate and, in this embodiment, traverses the shaft 44. This enables pivotal adjustment of the angular position of the seat back 18 with respect to the seat track assembly 12 to any user desired position. When the selected recliner position is reached, the release lever 30 is released and automatically returns to the locked position to prevent further movement of the seat back with respect to the seat track assembly 12.

Figure 9:
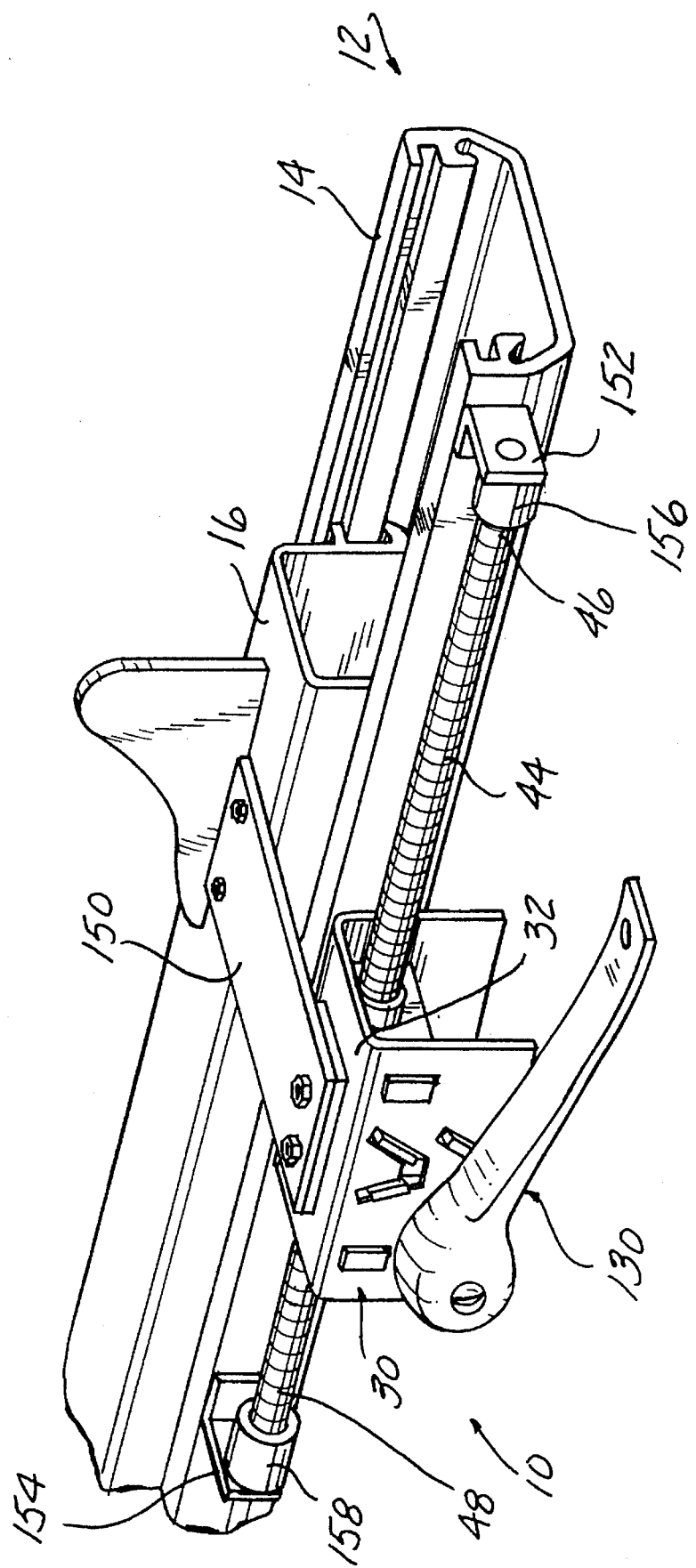
FIG. 9 is a perspective view showing the linear actuator of the present invention mounted for use as a vehicle seat adjuster.

As shown in FIG. 9, the linear actuator 10 of the present invention may also be mounted for use as a horizontal, fore and aft seat adjuster. In this embodiment, the housing 30 of the linear actuator 10 is fixedly mounted to the upper seat track 16 by means of a suitably formed bracket 150 which is fixedly joined to the upper track 16 and to the top wall 32 of the housing 30.

Further, the shaft 44 is fixedly and non-rotatably mounted to the lower track 14 by means of brackets 152 and 154 which are spaced apart and fixedly mounted to the lower track 14. Collars 156 and 158 are mounted on each bracket 152 and 154, respectively, and fixedly receive the first and second ends 46 and 48, respectively, of the shaft 44.

The operation of the linear actuator 10 shown in FIG. 9 is the same as that described in the previous two embodiments in that when the release lever 130 is in the locked position, the rotatable element 60 in the linear actuator 10 is prevented from rotation and longitudinal movement along the shaft 44 despite any fore and aft forces exerted on the upper track 16 of the seat track assembly 12. However, when the release lever 130 is pivoted to the unlocked position, the rotatable element 60 in the linear actuator 10 is free to rotate and traverse along the shaft 44. This in turn allows the user to manually adjust the horizontal fore and aft position of the upper track 16 with respect to the lower track 14 by exerting horizontal fore or aft forces on the upper track 16. Such axial forces result in movement of the upper track 16 through rotation of the rotatable element 60 about the shaft 44.

In summary, there has been disclosed a unique infinitely adjustable linear actuator which is ideally suited for use in vehicle seats as a seat recliner actuator or as a seat adjuster actuator. The linear actuator of the present invention is simply constructed and has a small compact size and a light weight. Further, the linear actuator provides a reliable, smooth, low force release; but still when in the engaged position, prevents any chucking or movement of the movable component of the seat with respect to a fixed component of the seat, such as between the seat back and the seat bottom. The linear actuator of the present invention may also be employed as a horizontally mounted seat recliner, a vertically mounted seat recliner or as a horizontal, fore and aft seat position adjuster.

What is claimed is:

1. A linear actuator for adjusting the position of one movable component relative to another component, the linear actuator comprising:

a threaded shaft;

a rotatable element having an internally threaded bore threadingly engaged with the shaft;

a housing having opposed ends, the housing disposed about the rotatable element;

first and second bearing means, mounted at the opposite ends of the housing, for providing bearing surfaces for the rotatable element, the first and second bearing means spaced apart to permit axial movement of the rotatable element therebetween into rotatable engagement with one of the first and second bearing means under axial loads on the shaft; and means, mounted on the housing, for displacing the rotatable element from engagement with either of the first and second bearing means to a non-rotatable position disengaged from both of the first and second bearing means.

2. The linear actuator of claim 1 wherein the displacing means comprises:

first and second moving members disposed in the housing, each movable from a first engaged position with the rotatable element in which the first and second moving members disengage the rotatable element from both of the first and second bearing means and a second disengaged position with respect to the rotatable element; and means, mounted in the housing and coupled to the first and second moving members, for moving the first and second moving members between the first and second positions.

3. The linear actuator of claim 2 wherein the moving means comprises:

bidirectional rotatable drive means, mounted in the housing and connected to first and second moving members, for driving the first and second moving members between the first and second positions.

4. The linear actuator of claim 3 wherein moving means further comprises:

guide means, formed on first and second moving members and the housing, for guiding movement of first and second moving means between the first and second positions.

5. The linear actuator of claim 4 wherein the guide means comprises:

at least one pair of tabs extending outwardly from each of the first and second moving members; and guide slots formed in the housing and slidably receiving the at least one pair of tabs on the first and second moving members.

6. The linear actuator of claim 5 wherein:

the at least one pair of tabs extend at an angle from a plane of each corresponding first and second moving members; and the guide slots extend at the same angle as the at least one pair of tabs such that movement of the tabs within the guide slots guides the movement of the first and second moving members into and out of engagement with the rotatable element.

7. The linear actuator of claim 5 wherein:

the at least one pair of tabs on the first moving member are aligned at an identical first angle from the plane of the first moving member; and the at least one pair of tabs on the second moving member are aligned at an identical first angle with respect to the plane of the second moving member and extend in an opposite direction from the at least one pair of tabs on the first moving member when the first and second moving members are mounted in the housing.

8. The linear actuator of claim 4 wherein the guide means comprises:

first and second pairs of spaced tabs formed on each of the first and second moving members; and aligned guide slots formed in opposed portions of the housing for receiving one tab of each of the first and second pairs of spaced tabs on the first and second moving members.

9. The linear actuator of claim 2 further comprising:

means for interconnecting the first and second moving members for simultaneous movement by the moving means.

10. The linear actuator of claim 9 wherein the interconnecting means comprises:

a slot formed in the first moving member; and a leg formed on and extending outward from the second moving member, the leg extending through the slot in the first moving member.

11. The linear actuator of claim 10 wherein the moving means further comprises:

a rotatable drive pin mounted in the housing;

a lever mounted on the drive pin and extending exteriorly from the housing for bidirectionally rotating the drive pin upon bidirectional pivotal movement of the lever; and a pair of drive fingers mounted on the drive pin, the pair of drive fingers spaced apart and alternatingly engaging the leg of the second moving member to move the interconnected first and second moving members between the first and second positions upon bidirectional movement of the lever and the drive pin.

12. The linear actuator of claim 2 wherein the moving means comprises:

a rotatable drive pin mounted in the housing;

a lever mounted on the drive pin for bidirectionally rotating the drive pin upon bidirectional pivotal movement of the lever; and a drive finger mounted on the drive pin for engaging the first and second moving members to move the first and second moving members between first and second positions.

13. The linear actuator of claim 2 further comprising:

an enlarged annular collar formed intermediately between opposite ends of the rotatable element;

the first and second moving members are disposed on opposite sides of the annular collar and engage the annular collar when the first and second moving members are in the first position.

14. The linear actuator of claim 2 wherein each of the first and second moving members further comprises:

an aperture receiving the rotatable element therethrough.

15. The linear actuator of claim 14 wherein the aperture comprises:

a U-shaped slot opening to one end of each respective first and second moving member.

16. The linear actuator of claim 1 wherein:

the housing is pivotally mounted to one of upper and lower tracks of a vehicle seat track assembly; and the first end of the threaded shaft is pivotally connected to a seat back frame pivotally mounted to one of the upper and lower tracks.

17. The linear actuator of claim 1 wherein:

the housing is mounted to a seat back frame member pivotally mounted to one of lower and upper tracks of a vehicle seat track assembly; and one end of the shaft is pivotally attached to one of the lower and upper tracks.

18. The linear actuator of claim 1 wherein:

the housing is fixedly mounted to an upper track of a vehicle seat track assembly; and the threaded shaft is fixedly mounted to a lower track of the vehicle seat track assembly such that when the linear actuator is in an unlocked position the rotatable element is rotatingly traversable along the threaded shaft to permit axial adjustment of the upper track with respect to the lower track.

19. A linear actuator for adjusting the position of one movable component relative to another component, the linear actuator comprising:

a threaded shaft;

a rotatable element having an internally threaded bore threadingly engaged with the shaft;

an enlarged annular collar formed on the rotatable element, the annular collar having opposed side surfaces extending radially outward from an exterior surface of the rotatable element;

a housing having opposed ends and a side wall, the rotatable element mounted in the housing;

first and second bearing means, mounted at the opposite ends of the housing respectively, for providing low resistance bearing surfaces for the rotatable element;

first and second movable members disposed in the housing, each of the first and second movable members disposed adjacent to one of the side surfaces of the annular collar; and means, mounted on the housing, for moving the first and second moving members between a first position in which the first and second moving members engage the opposed side surfaces of the annular collar and disengage the rotatable element from either of the first and second bearing means to prevent rotation of the rotatable element, and a second position in which the first and second moving members are spaced from the annular collar to permit axial movement of the rotatable element into engagement with one of the first and second bearing means under an axial load acting in one direction on the threaded shaft and thereby rotation of the rotatable element.

20. The linear actuator of claim 19 further comprising:

means for interconnecting the first and second moving members for simultaneous movement by the moving means.

21. The linear actuator of claim 20 wherein the interconnecting means comprises:

a slot formed in the first moving member; and a leg formed on and extending outward from the second moving member, the leg extending through the slot in the first moving member.

22. The linear actuator of claim 19 further comprising:

guide means, formed on the first and second moving members and the housing, for guiding movement of the first and second moving members between the first and second positions.

23. The linear actuator of claim 22 wherein the guide means comprises:

at least one pair of tabs extending oppositely outwardly from each of the first and second moving members; and guide slots formed in the side wall of the housing and slidably receiving the at least one pair of tabs on the first and second moving members.

24. The linear actuator of claim 23 wherein:

the at least one pair of tabs on the first moving member extend at a first identical angle from the plane of the first moving member;

the at least one pair of tabs on the second moving member extend at a first identical angle from the plane of the second moving member; and the first and second moving members are mounted in the housing such that the at least one pair of tabs on the first moving member extend from the annular collar oppositely with respect to the at least one pair of tabs on the second moving member.

25. The linear actuator of claim 23 further including:

another pair of tabs spaced from the one pair of tabs and formed on each of the first and second moving members, the another pair of tabs on each of the first and second moving members disposed at the same first angle and orientation as the one pair of tabs on the same first and second moving member.

26. The linear actuator of claim 20 wherein the moving means comprises:

a rotatable drive pin mounted in the housing;

a lever mounted on the drive pin for bidirectionally rotating the drive pin upon bidirectional pivotal movement of the lever; and an arm mounted on the drive pin for engaging one of the first and second moving members to move the first and second moving members between first and second positions.

27. The linear actuator of claim 20 wherein the moving means further comprises:

a rotatable drive pin mounted in the housing;

a lever mounted on the drive pin and extending exteriorly from the housing for bidirectionally rotating the drive pin upon bidirectional pivotal movement of the lever; and a pair of drive fingers mounted on the drive pin, the pair of drive fingers spaced apart and alternatingly engaging one of the first and second moving members to move the interconnected first and second moving members between the first and second positions upon bidirectional movement of the lever and the drive pin.

28. The linear actuator of claim 19 wherein:

the housing is pivotally mounted to one of upper and lower tracks of a vehicle seat track assembly; and the first end of the threaded shaft is pivotally connected to a seat back frame pivotally mounted to one of the upper and lower tracks.

29. The linear actuator of claim 19 wherein:

the housing is mounted to a seat back frame member pivotally mounted to one of lower and upper tracks of a vehicle seat track assembly; and one end of the shaft is pivotally attached to one of the lower and upper tracks.

30. The linear actuator of claim 19 wherein:

the housing is fixedly mounted to an upper track of a vehicle seat track assembly; and the threaded shaft is fixedly mounted to a lower track of the vehicle seat track assembly such that when the linear actuator is in the unlocked position the rotatable element is rotatingly traversable along the threaded shaft to permit axial adjustment of the upper track with respect to the lower track.

31. A linear actuator comprising:

a threaded shaft;

a housing mounted about the shaft;

a rotatable element disposed in the housing about and operatively coupled to the threaded shaft;

bearing means mounted in the housing for forming bearing surfaces spaced from opposite ends of the rotatable elements; and means, mounted in the housing, for displacing the rotatable element from engagement with either of the bearing means to prevent rotation of the rotatable element and the threaded shaft.

32. The linear actuator of claim 31 wherein:

the rotatable element threadingly engages the rotatable shaft for relative rotation between the rotatable element and the threaded shaft when the displacing means is disengaged from the rotatable element and an axial force exerted in one direction on the threaded shaft urges the rotatable element into engagement with one of the bearing means.

33. The linear actuator of claim 31 wherein the displacing means comprises:

first and second moving members disposed in the housing, each movable from a first engaged position with the rotatable element in which the first and second moving members disengage the rotatable element from both of the bearing means and a second disengaged position with respect to the rotatable element; and means, mounted in the housing and coupled to the first and second moving members, for moving the first and second moving members between the first and second positions.

34. The linear actuator of claim 33 wherein the moving means comprises:

bidirectional rotatable drive means mounted in the housing, and connected to first and second moving members, for driving the first and second moving members between the first and second positions.

35. The linear actuator of claim 34 wherein moving means further comprises:

guide means, formed on first and second moving members and the housing, for guiding movement of first and second moving means between the first and second positions.

36. The linear actuator of claim 33 further comprising:

means for interconnecting the first and second moving members for simultaneous movement by the moving means.

37. The linear actuator of claim 33 wherein the moving means comprises:

a rotatable drive pin mounted in the housing;

a lever mounted on the drive pin for bidirectionally rotating the drive pin upon bidirectional pivotal movement of the lever; and a drive finger mounted on the drive pin for engaging the first and second moving members to move the first and second moving members between first and second positions.

38. The linear actuator of claim 33 further comprising:

an enlarged annular collar formed intermediately between opposite ends of the rotatable element;

the first and second moving members are disposed on opposite sides of the annular collar and engage the annular collar when the first and second moving members are in the first position.

* * * * *